: US 7,613,615 B1
(45) Date of Patent: Nov. 3, 2009

(12) United States Patent
Mahmood et al.

(54) CIRCUITS, SYSTEMS, AND METHODS FOR REAL-TIME DE-SHUFFLING OF SHUFFLED AUDIO DATA

(75) Inventors: Akhtar Mahmood, San Jose, CA (US); Cheng-Tie Chen, San Jose, CA (US); Ting-Chung Chen, San Jose, CA (US)

(73) Assignee: Magnum Semiconductor, Inc., Freemont, CA (US)

( * ) Notice: Subject to any disclaimer, the term of this patent is extended or adjusted under 35 U.S.C. 154(b) by 1176 days.

(21) Appl. No.: 10/871,287

(22) Filed: Jun. 17, 2004

(51) Int. Cl.
*G10L 21/00* (2006.01)

(52) U.S. Cl. .................. 704/275; 704/272; 704/500; 704/503

(58) Field of Classification Search .................. 704/275, 704/272, 500, 503
See application file for complete search history.

(56) References Cited

U.S. PATENT DOCUMENTS 5,940,411 A * 8/1999 Takeda ................... 714/701

| | | | |
|---|---|---|---|
| 2001/0015863 A1* | 8/2001 | Oguro | 360/22 |
| 2002/0093595 A1* | 7/2002 | Sugiyama et al. | 348/683 |
| 2003/0070040 A1* | 4/2003 | Sasaki et al. | 711/112 |
| 2004/0086000 A1* | 5/2004 | Wallace et al. | 370/503 |

* cited by examiner

*Primary Examiner*—Qi Han
(74) *Attorney, Agent, or Firm*—Thompson & Knight LLP; James J. Murphy

(57) ABSTRACT

A data de-shuffler includes a buffer having a set of addressable locations for storing data and control circuitry for de-shuffling a sequence of shuffled data samples. The control circuitry stores a first data sample of the sequence of shuffled data samples at a first location in the buffer with a first address generated from an entry in a look up table and stores a second data sample at a second location in the buffer with a second address generated by incrementing from the first address by a selected incrementation value. The first and second locations in the buffer place the first and second samples in corresponding positions in an un-shuffled sequence of samples.

10 Claims, 6 Drawing Sheets

CIRCUITS, SYSTEMS, AND METHODS FOR REAL-TIME DE-SHUFFLING OF SHUFFLED AUDIO DATA

FIELD OF INVENTION

The present invention relates in general to data processing techniques and in particular to circuits, systems, and methods for real-time de-shuffling of shuffled audio data.

BACKGROUND OF INVENTION

Most digital camcorders record and transmit compressed audio and video data in accordance with the International Electrotechnical Commission (IEC) Standard IEC 61834 for Helical-Scan Digital Video Cassette Recording Systems (the "DV" standard). On the other hand, most home entertainment systems, such as Digital Versatile Disk (DVD) player-recorders, and the like, operate on audio data in either the Moving Picture Expert Group (MPEG) or AC3 audio formats. Hence, in order to for a device or system to be compatible with a both a DV data source, such as a camcorder, and an MPEG or AC3 recording and playback system, such as a DVD player-recorder, some provision must be provided for "transcoding" between the DV and MPEG formats. This transcoding process can be difficult to implement in real-time systems, since the DV data rate is several times higher than the MPEG and AC3 data rates.

In order to mitigate effects such as burst errors, audio data samples recorded in accordance with the DV standard are "shuffled" during the encoding operation using modulo-arithmetic techniques. Therefore, during the DV to MPEG transcoding process, the DV encoded audio samples must be "de-shuffled" such that the proper temporal sequential relationship between data is restored. There are a number of ways in which the de-shuffling operation may be performed; however, most conventional digital signal processor (DSP) de-shuffling techniques require many barrel shifting operations and the utilization of a substantial amount of memory. Furthermore, such conventional techniques require relatively complicated firmware, and do not guarantee transcoding in real-time.

In sum, techniques are required for de-shuffling DV encoded audio samples, which are efficient and may be performed in real-time. Such techniques should be particularly applicable to DV to MPEG transcoding processes, although not necessarily limited thereto.

SUMMARY OF INVENTION

The principles of the present invention are embodied in circuits, systems, and methods for de-shuffling data, for example audio data shuffled in accordance with one of the algorithms defined in the DV standard. According to one exemplary embodiment, a data de-shuffler is disclosed which includes a buffer having a set of addressable locations for storing data and control circuitry for de-shuffling a sequence of shuffled data samples. The control circuitry stores a first data sample of the sequence of shuffled data samples at a first location in the buffer with a first address generated from an entry in a look-up table and stores a second data sample at a second location in the buffer with a second address generated by incrementing from the first address by a selected incrementation value. The first and second locations in the buffer place the first and second samples in corresponding positions in an un-shuffled sequence of samples.

The principles of the present invention advantageously support de-shuffling operations, which are both efficient and can be performed in real-time. These efficient de-shuffling operations are particularly useful for performing transcoding operations between data at different data rates. For example, the principles of the present invention may be advantageously applied to the de-shuffling required for real-time transcoding between DV audio data and MPEG or AC3 audio data. During transcoding operations, the inventive concepts also support real-time audio editing such that a user-selected raw audio data can be used to replace the DV audio data following real-time user selection commands. Additionally, the inventive concepts support substantially simultaneous de-shuffling and encoding/decoding by providing for multiple buffers for utilization in the de-shuffling operations. Furthermore, multiple copies of the de-shuffled data or user selected audio data are stored in memory such that decoding/encoding operations can be performed while identical data is available for loopback monitoring.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTION

The principles of the present invention and their advantages are best understood by referring to the illustrated embodiment depicted in FIGS. 1-6 of the drawings, in which like numbers designate like parts.

Figure 1:
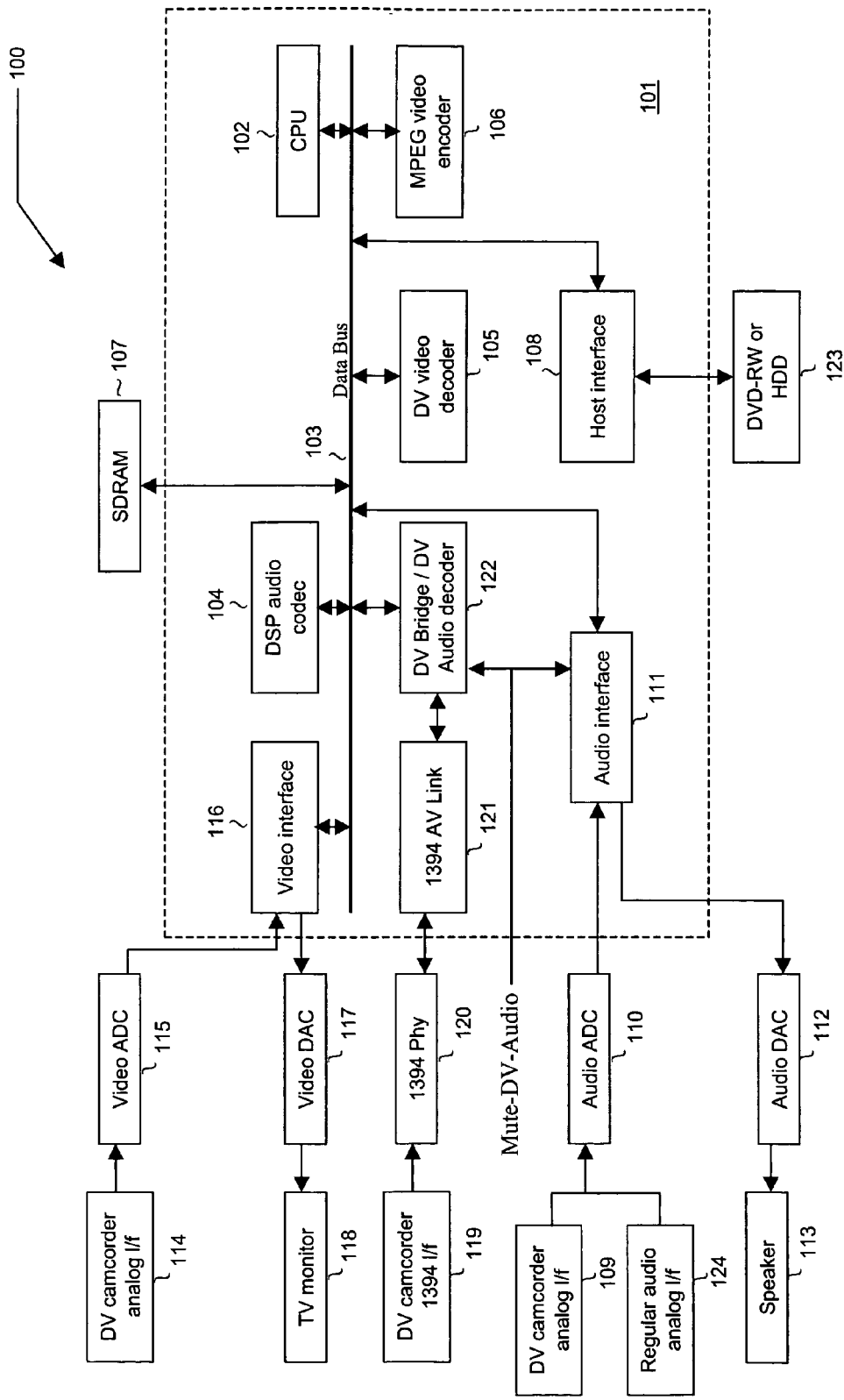
FIG. 1 is a block diagram of an exemplary audio-video recording and playback system suitable for describing the principles of the present invention.

FIG. 1 is a high level block diagram of an audio-video recording and playback system 100 based upon a single-chip audio-video encoding and decoding chip 101, according to the principles of the present invention.

A central processing unit (CPU) 102 operating in conjunction with a data bus 103 implements overall control of audio-video encoder and decoder chip device 101. A digital signal processor (DSP) audio codec 104 operating in conjunction with data bus 103 provides two-channel audio decoding and encoding in either the Motion Pictures Expert Group (MPEG) or AC3 formats. A digital video (DV) video decoder 105 and an MPEG video codec 106 operating in conjunction with external synchronous dynamic random access memory (SDRAM) 107, allow received DV video data to be transcoded into MPEG video data. Audio and video data are written to, and read from, an external medium 123, such as a read-write digital versatile disk (DVD-RW) or computer hard drive (HDD), through a host interface 108 and data bus 103.

DV analog audio data, such as that produced by a DV camcorder analog interface 109, are input through an external analog to digital converter (ADC) 110 and an internal audio interface 111. Alternatively, a regular audio analog interface 124 inputs raw analog audio through ADC 110 and internal audio interface 111, when the "mute DV audio" feature shown in FIG. 1 is selected, for example by depressing a button or similar user-controlled device, and user-preferred raw audio data are input through port 124 for real-time audio editing in a DV transcoding session. Analog audio data are output through audio interface 111 and an audio digital to analog converter (DAC) 112 to a speaker system 113, headset, or similar monitoring subsystem.

DV analog video data, such as from a DV camcorder analog interface (I/F) 114, are input through an external video ADC 115 and internal video interface 116. Analog output video data are passed through a video DAC 117 to a TV monitor 118, or similar display device Compressed digital audio-visual data, such as from a digital camcorder 1394 interface 119, in accordance with the IEEE 1394 serial bus standard, are input through an external IEEE 1394 physical layer 120 and an on-chip IEEE 1394 compliant audio-visual (AV) link 121. A DV bridge/DV audio decoder 122 decodes the compressed audio input data to PCM form, and stores it through data bus 103 to external SDRAM 107, for conversion into MPEG or Dolby Digital Audio by DSP audio codec 104. Alternatively, when the "mute DV audio" feature is selected by the user, the DV audio decoding/de-shuffling feature is disabled, such that there is no de-shuffled/decoded DV data to be stored to the external SDRAM 107. In this case, user-selected raw audio data are input through the audio analog interface port 124, as described above, and stored in external SDRAM 107, for real-time audio editing during a DV audio-video transcoding session. DVD bridge/DV audio decoder 122 also transfers the incoming DV compressed video data into SDRAM 107 for subsequent transcoding by DVD video decoder 105 and MPEG video encoder 106.

Figure 2:
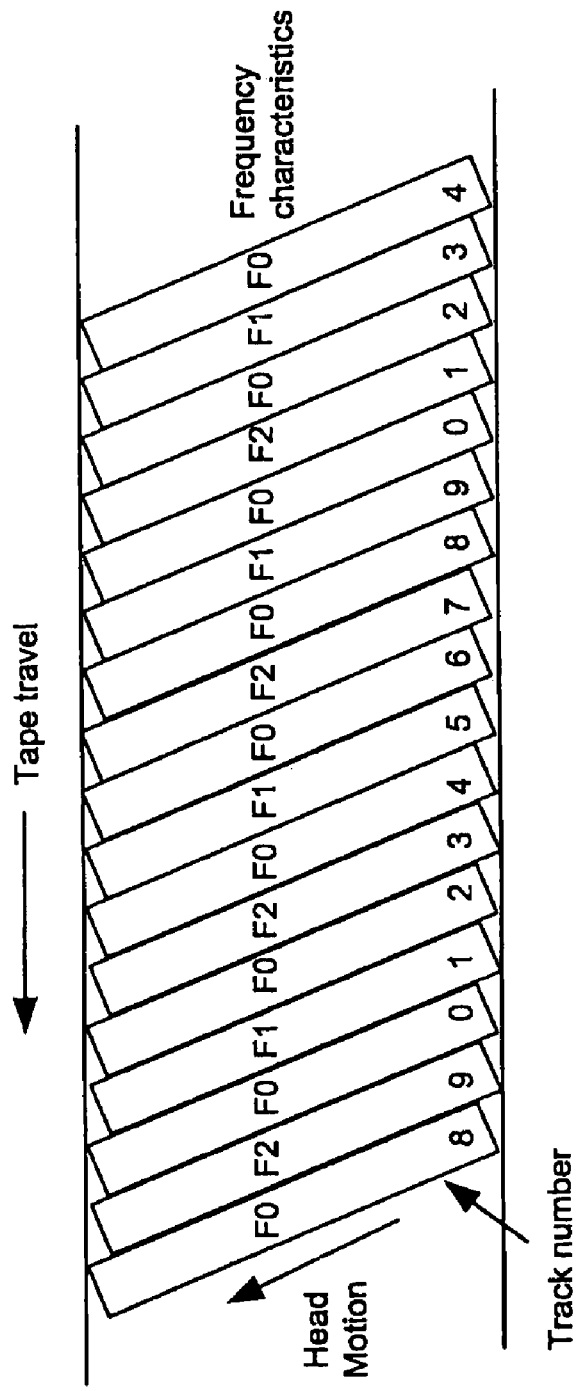
FIG. 2 is a diagram illustrating the recording of tracks of audio and video data on tape in accordance with the DV standard.
Figure 3:
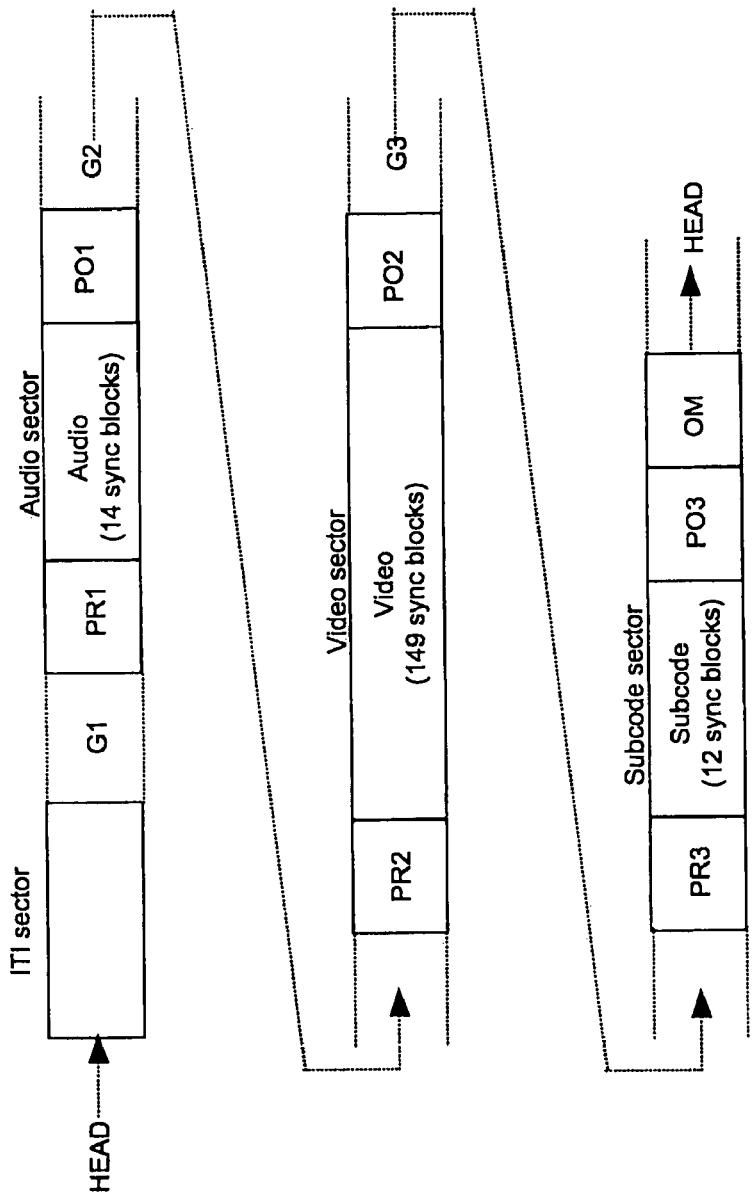
FIG. 3 is a diagram illustrating a representative audio-video track shown in FIG. 2, in accordance with the DV standard.

In accordance with the DV standard, one (1) audio frame data is recorded on tape as ten (10) tracks per television (i.e. audio-video) frame, for NTSC compliant systems, as shown in FIG. 2. Each track is partitioned into four (4) sectors including an ITI sector, an audio sector, a video sector, and a subcode sector, as shown in FIG. 3. In FIG. 3, G1-G3 are edit gaps, PR1 is the audio preamble, Audio is the audio sector, PO1 is the audio postamble, PR2 is the video preamble, Video is the video sector, PO2 is the video postamble, PR3 is the subcode preamble, Subcode is 12 subcode sync block, PO3 is the subcode postamble, and OM is the overwrite margin.

Figure 4:
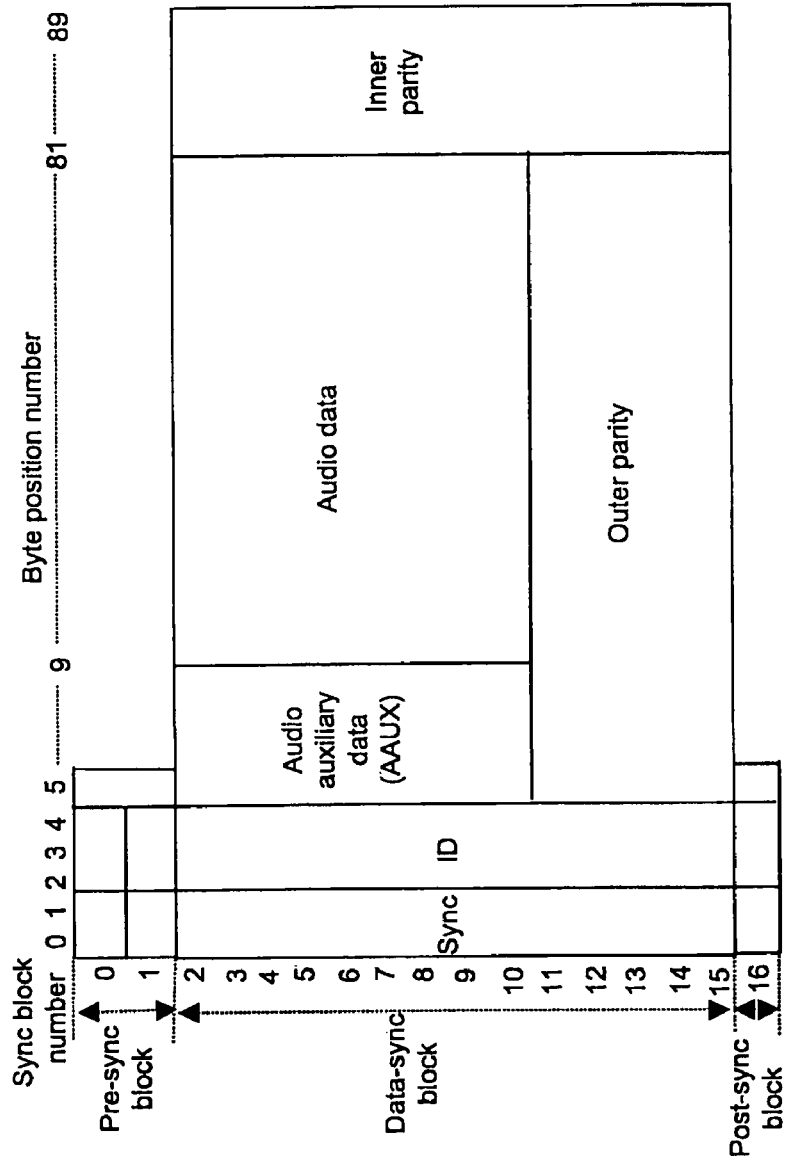
FIG. 4 is a diagram illustrating in further detail the audio sector of the representative audio-video track shown in FIG. 3, in accordance with the DV standard.

Each audio sector includes fourteen (14) audio sync blocks, each having synchronization data, an identification (ID) field, audio auxiliary data, parity fields, and audio data encoded into bytes, as shown in FIG. 4.

In accordance with the DV standard, the audio signal for one (1) audio frame is encoded as a pair of audio blocks, with each audio block composed of five (5) audio sectors from five (5) consecutive tracks of data from the tape. For each audio frame, the first audio block is composed of the audio sectors from adjacent tracks 0-4 and the second audio block is composed of the audio sectors from adjacent tracks 5-9.

The DV standard defines three (3) available audio frequencies, 48 kHz, 44.1 kHz, and 32 kHz, and four (4) different modes, namely the 48 k, 44.1 k, 32 k, and 32 k-2ch modes. The 48 k, 44.1 k and 32 k modes record data as channels Ch1 and Ch2 respectively in the first and second audio blocks. In the 48 k, 44.1 k and 32 k modes, channels Ch1 and Ch2 playback simultaneously. In the 32 k_2ch mode, data are recorded as two (2) blocks or four (4) channels. Only two (2) channels from the two blocks or four channels playback in the 32 k-2ch mode, the other two audio channels are currently unused. I.e., the 32 kHz-2ch mode is encoded in four (4) channels or two (2) audio blocks, and two channels out of these two audio blocks (with a total of four channels) are selected for playback during the decoding process.

During recording, sixteen-bit samples are input from a camcorder in the 48 k, 44.1 k, and 32 k modes and deshuffled into two (2) bytes per sample for storage on the encoder chip's attached SDRAM. During deshuffling in the 32 k-2ch mode, pairs of twelve-bit samples are input and partitioned into two twelve-bit samples to constitute the audio block. In all modes, the data bytes are designated Dn, where n is an integer from 0 to the highest index for the audio frame, discussed below.

In DV audio, the audio sampling frequency can be set as either synchronous or not synchronous with the video frame frequency. When it is synchronous, it is called the "locked mode", which contains the 48 k, 32 k, and 32 k-2ch modes, and the number of audio samples per frame keeps a regular sequence or fixed value. When it is not synchronous, it is called the "unlocked mode", which contains the 48 k, 44.1 k, 32 k, and 32 k-2ch modes, and the number of audio samples per frame is variable. In unlocked mode, an audio frame is encoded into a variable size depending on the audio source and the encoding mode. For example, for an NTSC system in unlocked mode, an audio frame of 48 k mode data can be composed of between 1,580 and 1,620 bytes, while during encoding, an audio frame of 48 k mode data is approximately composed of 1,602 bytes in average. Similarly, an audio frame of 32 k mode data can be composed of between 1,053 and 1,080 bytes, while during encoding an audio frame of 32 k mode data is generally composed of 1,068 bytes in average.

The audio bytes generated during one audio frame are shuffled across the corresponding ten (10) tracks, or ten (10) audio sectors, between the two (2) audio blocks to mitigate the effects of burst errors. The shuffling algorithms are dependent on the audio-video system (i.e. NTSC or PAL), and the audio encoding mode. For example, in an NTSC system, for either the 48 k, 44.1 k, and 32 k modes, the shuffling algorithms are as follows, in which the index n represents the data byte Dn being encoded for the current audio frame:

| | |
|---|---|
| Track Number: | $(INT(n/3) + 2 \times (n \bmod 3)) \bmod 5$ for CH 1 |
| | $(INT(n/3) + 2 \times (n \bmod 3)) \bmod 5 + 5$ for CH 2 |
| Sync block number: | $2 + 3 \times (n \bmod 3) + INT((n \bmod 45)/15)$ |
| Byte position number: | $10 + 2 \times INT(n/45)$ for the most significant byte |
| | $11 + 2 \times INT(n/45)$ for the least significant byte | in which n = 0 to 1619 for 48k mode;
n = 0 to 1488 for 44.1k mode; and
n = 0 to 1079 for 32k mode.

The shuffling algorithm for 32k-2ch mode data in the NTSC format is:

| | | |
|---|---|---|
| Track Number: | $(INT(n/3) + 2 \times (n \bmod 3)) \bmod 5$ | for CH 1 |
| | $(INT(n/3) + 2 \times (n \bmod 3)) \bmod 5 + 5$ | for CH 2 |
| Sync block number: | $2 + 3 \times (n \bmod 3) + INT((n \bmod 45)/15)$ | |
| Byte position number: | $10 + 3 \times INT(n/45)$ for the most significant byte Y | |
| | $11 + 3 \times INT(n/45)$ for the most significant byte Z | |
| | $12 + 3 \times INT(n/45)$ for the least significant byte | | in which n = 0 to 1079.

The DV standard, hereby incorporated by reference, sets forth a similar set of algorithms for shuffling PAL format data encoded in the 48 k, 44.1 k, 32 k, or 32 k_2ch modes.

In accordance with the DV specification, 1394 AV Link 121 of FIG. 1 receives audio sync blocks numbers 0 to 16 of each audio sector shown in FIG. 4, strips out audio bytes 2 to 81 from audio sync blocks 2 to 10, and sends those bytes to DV Bridge/DV audio decoder 122 for de-shuffling. For the 48 k, 44.1 k, and 32 k modes, samples are reconstructed from two (2) bytes, and for the 32 k_2ch mode, from three (3) bytes.

Figure 5:
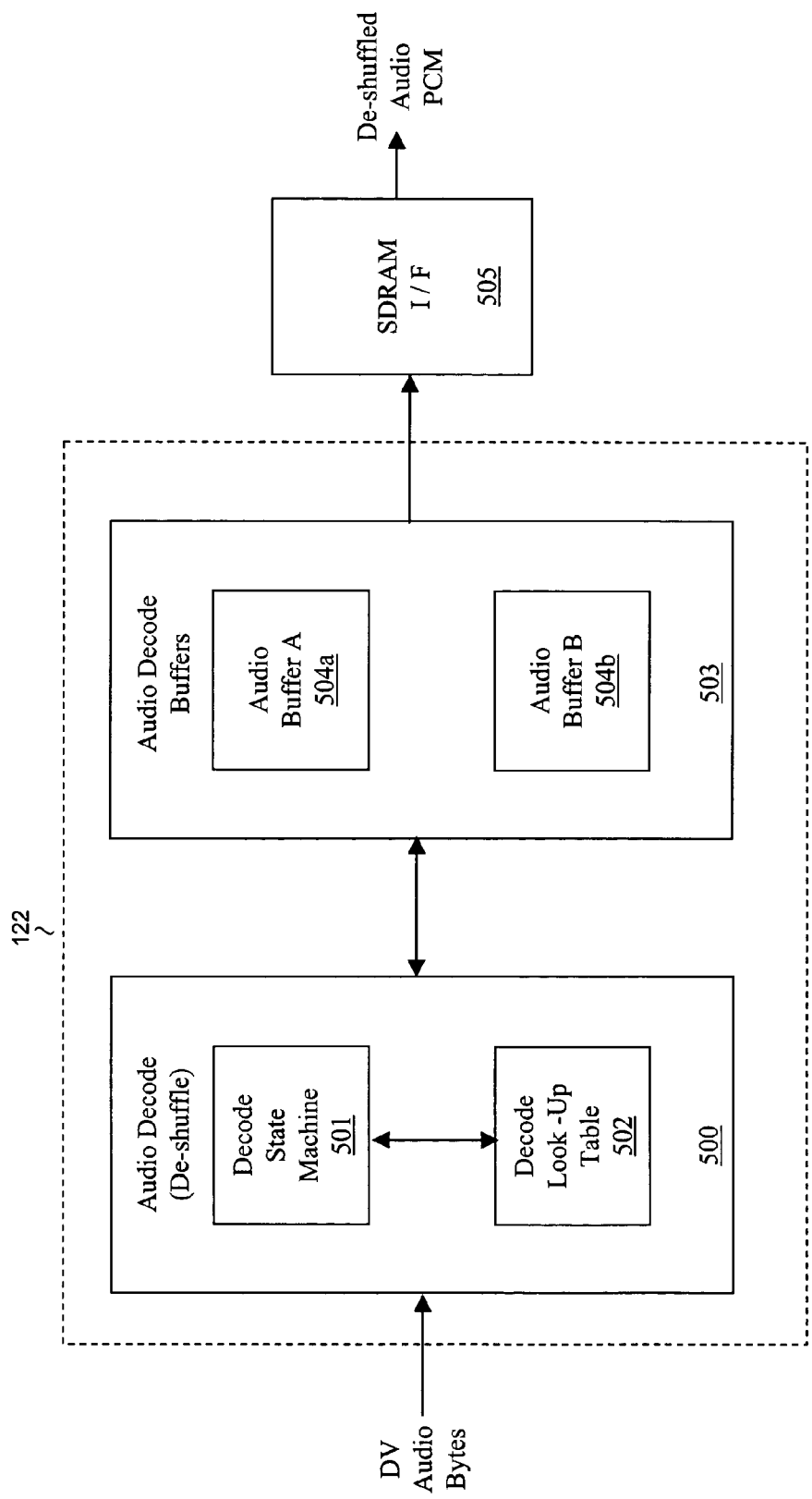
FIG. 5 is a block diagram of an exemplary audio decode/de-shuffle module embodying the inventive principles, and suitable for use in transcoding operations performed by the system of FIG. 1.

FIG. 5 is a block diagram of an audio de-shuffler module 500 according to the principles of the present invention. In exemplary system 100 shown in FIG. 1, audio decoder/de-shuffler module 500 forms a portion of DV bridge/DV audio decoder 122.

Audio decoder-de-shuffler module 500 includes a decode state machine 501 and a look-up table (LUT) unit 502. LUT unit 502 includes a local memory, for example registers in logic, and address decoding circuitry for accessing a set of entries of the look-up tables discussed below. Audio decoder/de-shuffler module 500 operates in conjunction with a set of audio decoder buffers 503. Audio decoder buffers 503 include an audio buffer A 504a and an audio buffer B 504b, which are utilized in a ping-pong fashion, also as discussed below.

According to the principles of the present invention, audio de-shuffling is carried out by way of LUT UNIT 502 and state machine 501. LUT UNIT 502 contains the first address location in audio buffers 503 for the first audio sample corresponding to every sync block number (i.e. audio sync block), of every track number (i.e. every track). The respective address locations for the remaining incoming audio samples corresponding to the same sync block number are then calculated by incrementing the current address location by a constant increment value. In the illustrated embodiment, the constant increment value is forty-five (45) for NTSC format data and fifty-four (54) for PAL format data. Tables 1 and 2 illustrate exemplary embodiments of the contents of LUT UNIT 502 for NTSC and PAL format data, respectively. In Tables 1 and 2, I represents the valid input audio data sync block number, and T represents the track number.

TABLE 1

| | T | | | | |
|---|---|---|---|---|---|
| I | 0/5 | 1/6 | 2/7 | 3/8 | 4/9 |
| 2 | 0 | 3 | 6 | 9 | 12 |
| 3 | 15 | 18 | 21 | 24 | 27 |
| 4 | 30 | 33 | 36 | 39 | 42 |
| 5 | 10 | 13 | 1 | 4 | 7 |
| 6 | 25 | 28 | 16 | 19 | 22 |
| 7 | 40 | 43 | 31 | 34 | 37 |
| 8 | 5 | 8 | 11 | 14 | 2 |
| 9 | 20 | 23 | 26 | 29 | 17 |
| 10 | 35 | 38 | 41 | 44 | 32 |

TABLE 2

| | T | | | | | |
|---|---|---|---|---|---|---|
| I | 0/6 | 1/7 | 2/8 | 3/9 | 4/10 | 5/11 |
| 2 | 0 | 3 | 6 | 9 | 12 | 15 |
| 3 | 18 | 21 | 24 | 27 | 30 | 33 |
| 4 | 36 | 39 | 42 | 45 | 48 | 51 |
| 5 | 13 | 16 | 1 | 4 | 7 | 10 |
| 6 | 31 | 34 | 19 | 22 | 25 | 28 |
| 7 | 49 | 52 | 37 | 40 | 43 | 46 |

TABLE 2-continued

| | T | | | | | |
|---|---|---|---|---|---|---|
| I | 0/6 | 1/7 | 2/8 | 3/9 | 4/10 | 5/11 |
| 8 | 8 | 11 | 14 | 17 | 2 | 5 |
| 9 | 26 | 29 | 32 | 35 | 20 | 23 |
| 10 | 44 | 47 | 50 | 53 | 38 | 41 |

The data for the first of each pair of audio blocks, corresponding to tracks 0-4 for the current audio frame, are written into audio buffer A 504a of FIG. 5, as follows. For example, if the incoming audio is in the NTSC format, the first sample of first data sync block (i.e. audio sync block 2) of the first track (i.e. track 0) has an address of 0 into audio buffer A 504a, as tabulated at the entry corresponding to row I=2 and column T=0 in Table 1. The addresses into audio buffer A 504a for the remaining samples for that data sync block are calculated incrementing by forty-five (45) with each sample. In this example, the second NTSC format audio sample of the first audio sync block will thus be associated with audio buffer address 45, the third sample will be associated with audio buffer address 90, and so on.

Continuing with the NTSC example, the first sample of second audio sync block of the first track, audio sync block 3, is associated with the location at address 15, as indicated by the entry at the row corresponding to I=3 and the column corresponding to T=0 of Table 1. The following samples of the second audio sync block are associated with buffer addresses 60,105, and so on, after incrementation by the constant forty-five (45). This process repeats itself as the data for all nine (9) data audio sync blocks of each of the five-(5) tracks of the first of the two audio channels of the audio frame. As an arbitrary example, the first sample of data sync block 4 of track 2 of the first audio is associated with address 36, as indicated by the entry at row I=4 and column of T=2 of Table 1.

Once the entire first audio block is received, audio buffer A 504a is disabled and the second of the two audio blocks of the audio frame is written into audio buffer B 504b. In this case, addresses to audio buffer B 504b for the samples from nine (9) audio sync blocks from the audio sectors of tracks 5-9 are again derived for the first sample of each audio sync block utilizing the alternate track numbers (i.e. T=5 to 9) assigned to the columns of Table 1, and incrementing by the constant value forty-five (45) for the remaining samples in that audio sync block.

Memory access circuitry 505, which generally includes logic within DV bridge/DV audio decoder 122 and a DRAM controller unit, transfers de-shuffled data from the inactive audio buffer 504a or 504b to SDRAM 107 of FIG. 1. Specifically, while samples of audio data are being written into audio buffer A 504b during de-shuffling, audio samples are read from audio buffer B 504b into SDRAM 107 of FIG. 1, for encoding into either the MPEG or AC3 formats. Audio buffers 504a and 504b then continuously ping-pong in a similar fashion for each pair of audio blocks received by DV audio bridge/DV audio decoder 121. As discussed above, the number of samples per audio frame varies depending on the mode and the audio source frequency. Therefore, before transmitting samples to SDRAM 107, a "samples per frame" detection is performed first, since a misalignment of even one audio sample in a data stream can cause audible artifacts in the ultimate output.

The raw PCM data samples in the inactive buffer 504a or 504b are preferably written into external SDRAM 107 of FIG. 1 twice. In other words, two copies of each audio block are stored in SDRAM 107. One stored audio block may then be accessed by DSP audio codec 104 and compressed, for example in accordance with the MPEG or AC3 algorithms. The compressed data are then written back into SDRAM 107. The compressed audio data, along the compressed video data, may be subsequently accessed from SDRAM 107 by CPU 102, multiplexed into an MPEG program or transport stream, and transferred back to SDRAM 107. Host interface 108 in turn transfers the multiplexed bit stream to external media 123, such as a hard-drive or DVD.

The second copy of the raw PCM data stored in SDRAM 107 may be simultaneously utilized to perform loop-back operations. For example, if no audio editing is required, these raw PCM data may be looped-back directly to external speaker 113 of FIG. 1, via DAC 112 and audio interface 113, for monitoring. If audio editing is being performed, audio data are input through ADC 110 and audio interface 111. In this case, the second copy of the raw PCM data stored in SDRAM 107 is also used simultaneously to perform loop-back operations, but the 1394 AV Link 121 and DV Bridge/Audio decoder 122 are not utilized.

Figure 6:
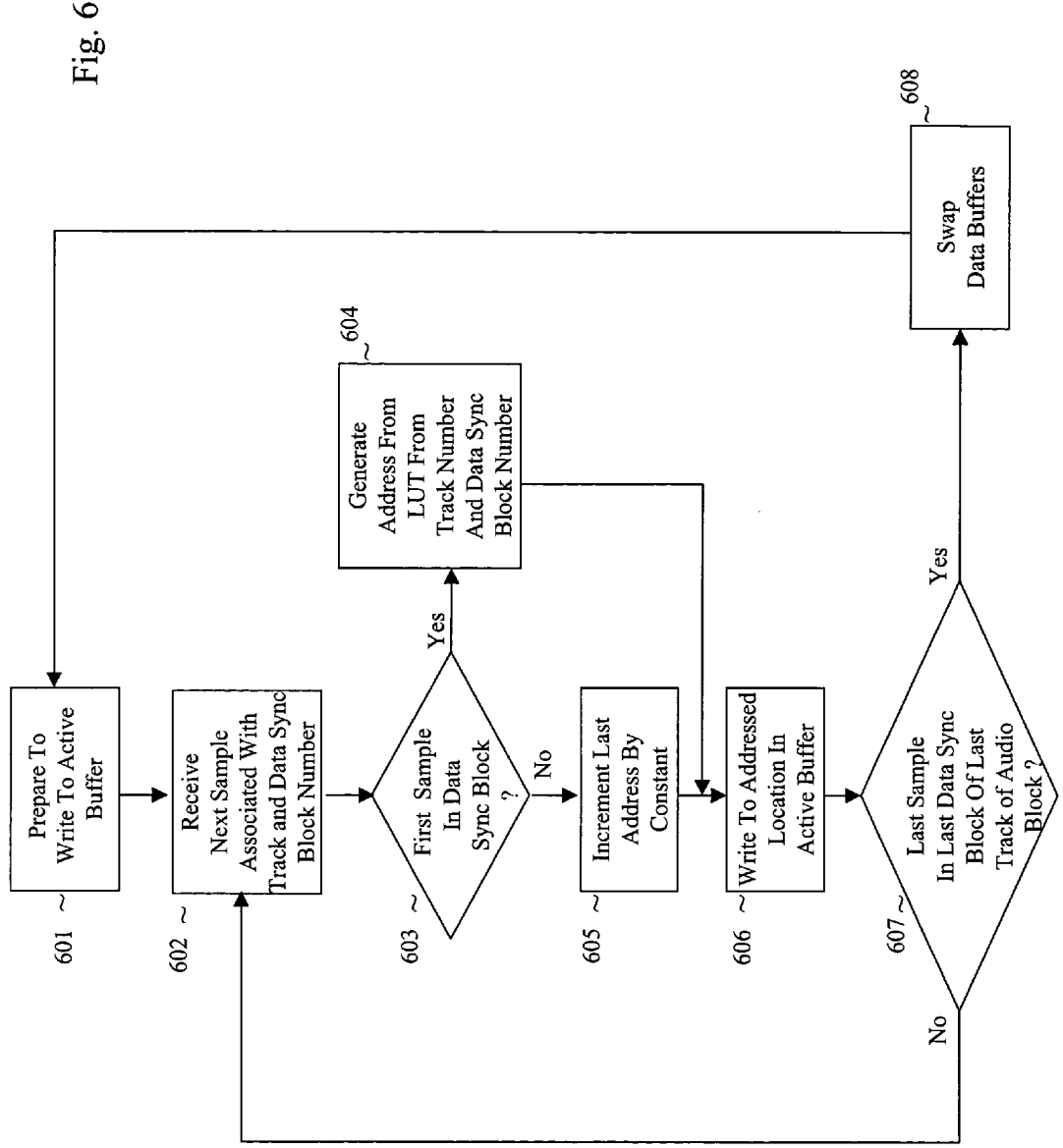
FIG. 6 is a flow chart illustrating representative operations of the decoder-de-shuffler module of FIG. 5.

FIG. 6 is a diagram illustrating the operation of state machine 501 and LUT unit 502 of FIG. 5. State machine 502 is in the idle state at block 601 waiting for the next audio sample from 1394 AV Link 121 of FIG. 1. Each sample subsequently received at block 602 is associated with an audio sync block having a data sync block number and a track having a track number, as described above.

If at block 603, the first sample in a new data sync block has been reached, then the track number and new data sync block number are utilized to access LUT unit 502 of FIG. 5 to obtain the corresponding address into the currently active audio buffer 504a or 504b. State machine 501 then returns to idle block 601 and waits for the next audio sample to arrive. When the next audio sample arrives, and if the current sample is from the same audio sync block, then the new address is generated by incrementing the last address by a constant at block 605. State machine 501 and LUT unit 502 then return to block 601 and wait for the next audio sample to arrive.

State machine 501 and LUT unit 502 continue to cycle through the states represented by blocks 601-605, until the last sample of the last data sync block of the last track of the current audio block is reached at block 606. When this state has been reached, the entire current audio block has been buffered into the active audio buffer 504a or 504b. Hence, in preparation for the next audio block, the active buffer 504a or 504b and the inactive buffer 504a or 504b are swapped at block 607.

Although the invention has been described with reference to a specific embodiment, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore, contemplated that the claims will cover any such modifications or embodiments that fall within the true scope of the invention.

What is claimed is:

1. An audio system comprising:
    input circuitry for inputting a stream of audio data shuffled in accordance with a selected shuffling algorithm;
    a de-shuffler for de-shuffling the stream of audio samples, the de-shuffler operable to:
        store a first audio sample of each data sync block of each track of an audio block in a buffer location corresponding to an address generated from a look-up table; and
        store each remaining audio sample of each data sync block of each track of the audio block in a buffer location corresponding to an address generated by incrementing by an incrementation value from a base address provided by the address generated from the look-up table, wherein the incrementation value is selected according to the selected shuffling algorithm;
    a memory for storing a sequence of de-shuffled audio samples of an audio block output from the buffer locations, wherein the memory stores two copies of the de-shuffled audio samples output from the buffer locations;
    processing circuitry for compressing one of the two copies of the audio samples stored in memory; and
    loop-back circuitry for playing-back another one of the two copies of the audio samples stored in memory.

2. The audio system of claim 1, wherein the buffer locations are disposed in a selected one of set of alternating buffers, the selected one of the buffers storing audio samples being deshuffled by the de-shuffler and a second one of the buffers concurrently providing de-shuffled audio samples to the memory.

3. The audio system of claim 1, wherein the processing circuitry compresses the one of the two copies of the audio samples into a selected one of MPEG and AC3 compression formats.

4. The audio system of claim 1, wherein the look-up table is selected from a set of look-up tables for respectively de-shuffling NTSC and PAL format audio samples and the incrementation value is selected from a set of constants for respectively de-shuffling NTSC and PAL format audio samples.

5. The audio system of claim 4, wherein the audio system is fabricated on a single integrated circuit chip.

6. The audio system of claim 1, wherein the stream of shuffled data samples comprises a stream of data samples each associated with an audio sync block, a track number, and an audio block in accordance with the digital video (DV) standard.

7. The audio system of claim 6; wherein each sample comprises two bytes of data encoded in a selected one of the 48 k, 44.1 k, and 32 k modes in accordance with the digital video (DV) standard.

8. The audio system of claim 6, wherein each sample-pair comprises two twelve-bit samples of data encoded in the 32 k 2ch mode in accordance with the digital video (DV) standard.

9. The audio system of claim 6, wherein the first sample of the stream of shuffled data comprises a first sample in a corresponding audio sync block and the second sample of the stream of shuffled data comprises another sample in the audio sync block.

10. The audio system of claim 6, wherein the stream of shuffled data is formatted in accordance with a selected one of NTSC and PAL audio formats in accordance with the digital video (DV) standard.

* * * * *